(No Model.)
S. A. SMITH.
SUPPORT FOR SHELVES.
No. 498,945. Patented June 6, 1893.
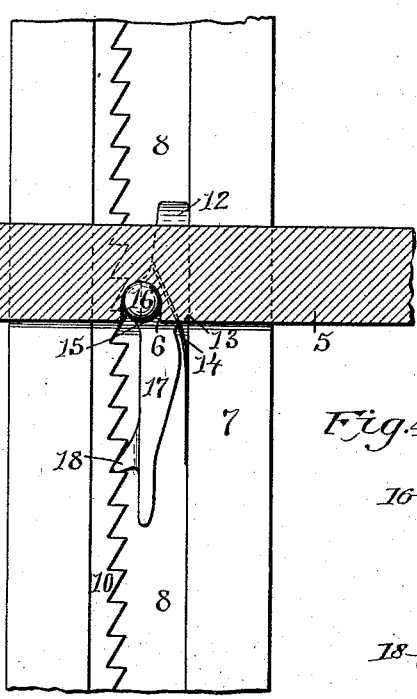
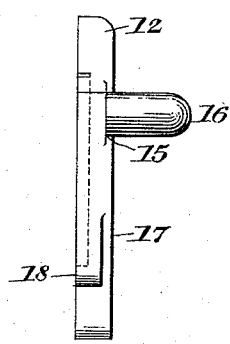
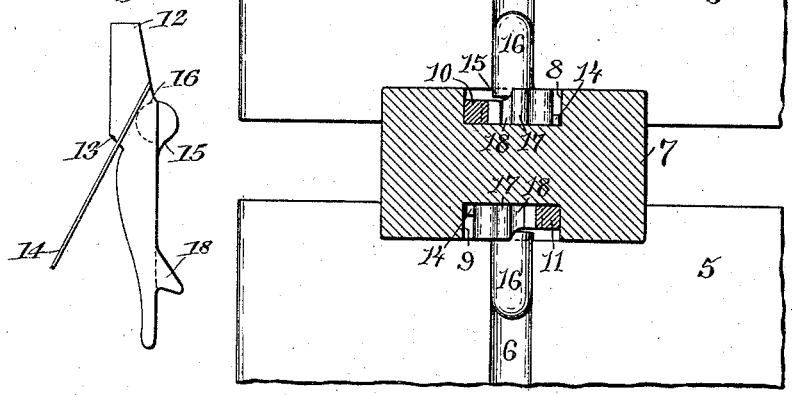
WITNESSES:
Henry J. Miller
Chas. H. Luther Jr.
INVENTOR:
Scott A. Smith
by Joseph A. Miller &Co.
Att'ys.

UNITED STATES PATENT OFFICE.

SCOTT A. SMITH, OF PROVIDENCE, RHODE ISLAND.

SUPPORT FOR SHELVES.

SPECIFICATION forming part of Letters Patent No. 498,945, dated June 6, 1893.

Application filed July 27, 1892. Serial No. 441,381. (No model.)

*To all whom it may concern:*

Be it known that I, SCOTT A. SMITH, of the city of Providence, in the county of Providence and State of Rhode Island, have invented certain new and useful Improvements in Supports for Shelves; and I hereby declare that the following is a full, clear, and exact description of the same, reference being had to the accompanying drawings, forming part of this specification.

This invention has reference to the construction of adjustable devices for supporting shelves, and is designed to be an improvement on a somewhat similar device for which a patent was granted to me on February 26, 1878, No. 200,772.

The object of this invention is to produce an adjustable support for shelves which, while being interchangeably operative on a right or left hand rack, will, in either position, protect the article placed on the end of the shelf from contact with such rack.

The further object of the invention is to produce an adjustable device for supporting shelves which will be simple in construction and effective and durable in operation.

The invention consists in certain peculiar features of construction and combination of novel parts which will hereinafter be more particularly described and pointed out in the claims.

Figure 1 represents a cross-sectional view of a shelf supported by the improved device. Fig. 2 represents a bottom view of the ends of two shelves supported by the improved device on a standard in the opposite grooves of which are right and left hand racks. Fig. 3 represents an edge view of the device removed from the standard. Fig. 4 represents a side view of the same, Fig. 5 being a back view thereof.

Similar numbers of reference designate corresponding parts throughout.

In the drawings 5—5 indicate shelves which have the longitudinal grooves 6—6 formed in their lower surfaces, and 7 is a vertical standard which, is furnished with the grooves or runways 8 and 9 formed in the opposite surfaces of the standard,—it is understood that a standard 7 having two grooves 8 or 9 is provided at each end of the shelves. In the grooves 8 and 9 are secured the racks 10 and 11, the teeth of the rack 10 extending toward the right, while those of the rack 11 extend toward the left.

The adjustable device, which is supported by the racks, has an upper member 12 which bears against the smooth side surface of the groove 8 or 9 when in its normal position of supporting the shelf, and extending from the rounded lower shoulder 13 of this member is a spring 14 also bearing against the smooth side of the groove and tending to throw the member 12 toward the rack 10 or 11 when the device is relieved from weight. The upper end of the member 12 is narrow and its forward edge extends downward, gradually curving outward to a point opposite the shoulder 13 where the upper surface of the main portion is extended forward to form a lip 15 which overlaps the teeth of the rack when thrust forward by the spring 14. The lip 15 forms the base portion of the stud 16 which extends at right angles with the side of the member 12 and supports one end of the shelf 5 being adapted to enter in the groove 6 in the under side thereof. Extending downward below the lip 15 is the shank 17 which gradually tapers toward the lower end slightly above which is located the pawl 18 which extends toward the rack 10 or 11 and engages with the teeth of the same.

It will be seen by reference to Fig. 2 of the drawings that when used on either a right or left hand rack the lip 15 will overlap the teeth of the rack when the device is relieved of weight and is being moved upward, thus giving clearance between the edge of the shank 17 and the teeth of the rack and allowing the device to be easily moved upward, while at the same time the pawl is kept in engagement with the rack by the spring 14.

Having thus described my invention, I claim as new and desire to secure by Letters Patent—

1. In a support for shelves, the combination with suitable standards having vertical grooves formed in the inner sides thereof and racks secured at the sides of said grooves, of an adjustable support consisting of an upper member having a rear plane surface and a downwardly outwardly curved front edge ending in an overhanging lip carrying a horizontal-stud, a spring extending from the rear lower portion of the upper member, and a shank extending downward from said member and having a forwardly-extending pawl adapted to engage the teeth of the rack, as described.

2. The combination with the grooved standard 7 and the rack 10 secured in said groove, of an adjustable supporting-device consisting of the upper member 12, the forwardly-extending overhanging lip 15 carrying the stud 16, the spring 14 extending from the lower portion of the member 12, the shank 17 having the forwardly-projecting pawl 18 and a shelf adapted to be supported at one end by the stud 16, as and for the purpose described.

In witness whereof I have hereunto set my hand.

SCOTT A. SMITH.

Witnesses:
   HENRY J. MILLER,
   JOSEPH A. MILLER.